United States Patent [19]

Shibata

[11] 3,952,107

[45] Apr. 20, 1976

[54] GROWTH PROMOTION USING A CERTAIN GLYCERIDE MIXTURE

[75] Inventor: Fumio Shibata, Nagoya, Japan

[73] Assignee: Nihon Nohyaku Kabushiki Kaisha, Tokyo, Japan

[22] Filed: Apr. 1, 1974

[21] Appl. No.: 456,746

[30] Foreign Application Priority Data

Apr. 4, 1973  Japan.............................. 48-38524

[52] U.S. Cl. ............................................... 424/311
[51] Int. Cl.² ......................................... A61K 31/22
[58] Field of Search .................................... 424/311

[56] References Cited
OTHER PUBLICATIONS

Chemical Abstracts, Vol. 58 (1963), p. 3723g.
Chemical Abstracts, Vol. 62 (1965), p. 11064a.

*Primary Examiner*—V. D. Turner
*Attorney, Agent, or Firm*—Brisebois & Kruger

[57] ABSTRACT

The present invention is concerned with the use of a lower fatty acid glyceride as a feed additive having a growth-promoting effect in rearing animals and a method of rearing animals using said feed additive.

5 Claims, No Drawings

GROWTH PROMOTION USING A CERTAIN GLYCERIDE MIXTURE

DETAILED DESCRIPTION OF THE INVENTION

The present invention relates to a method of rearing animals characterized by providing animals with a lower fatty acid glyceride.

Ruminants such as cattle, sheep, goat have the ability to digest fibrous feed by virtue of their having in their rumens symbiotic microbes, which have cellulolytic activity, and are therefore able to digest feeds such as grass, legume, rice straw and the like. In this case, so called lower fatty acids are produced by the group of microbes through their cellulose digestion. They are mostly acetic acid, propionic acid, butyric acid, and in addition a small quantity of higher acids such as valeric acid and caproic acid. The ruminants absorb these lower fatty acids through their rumen walls and utilize as energy sources and use these as sources of nutrients in the formation of their muscles and other organs or tissues and in the synthesis of milk constituents.

The present invention aims at supplying directly as a feed especially acetic acid, propionic acid and butyric acid among lower fatty acids which are and absorbed in comparatively large quantity by the ruminants, but in particular at this juncture, emphasis is laid on the relation to the utilization of the three acids combined with glycerin in a form of glyceride.

Conventionally, acetic acid, propionic acid and butyric acid have been supplied in a form of a neutralized salt, mainly sodium salt or calcium salt. Propionate in particular has been indicated to be available for treatment of ruminant Ketosis. On the other hand, it has been experimentally demonstrated that the long term supply of appreciable amounts of neutralized salt to meet a certain part of energy intake raises the accumulation of alkali in the body fluid and secondarily causes functional disorders of body circulation mechanisms. It is also known that the supply of free acid as it is causes a refusal of feed intake by the animals or a decline in the feed volume taken owing to a stimulus attributed to its acidity.

The present invention is concerned in realizing the intake of a sufficient volume of feed, in consideration of the above mentioned factors, by means of combining acetic acid, propionic aicd and butyric acid with glycerin, thereby removing the acidity and letting them not take excess alkali as in the case of using a neutralized salt. Moreover, glycerin moiety may be utilized as an intermediate fat synthesis. Therefore, the lower fatty acid glyceride is useful to provide a comparativily large amount to meet energy requirment of ruminants.

Furthermore, a salient feature of the present invention lies in a formulation of a certain ratio of acetic acid, propionic acid and butyric acid content to the total constituents in supplying glyceride, thus deriving from it a glyceride composition for the most efficent use in meeting the energy requirements of the ruminants.

To explain the present invention in further detail, the glyceride to be used in the present invention comprises either a mixture of monoacetin, diacetin, triacetin, monopropionin, dipropionin, tripropionin, monobutyrin, dibutyrin, and tributyrin or a mixture of monoglyceride, diglyceride and triglyceride consisting of acetic acid, propionic aicd and butyric acid in one molecule. Thus it is desirable that the glyceride mixture to be used has a molar equivalent ratio range of 0.3–3.0 preferably 1.0–2.0 of propionic acid residue as against the sum of the molar equivalent of the other two acids put together. Moreover, it is desirable that monoglyceride, diglyceride and triglyceride are in the ratio 1:1:1.

Although they are not restricted to the present invention only, the representative mixed ratios of the above nine compounds are shown in the following Table.

Table 1

| | Mixed ratio (mole equivalent) | | |
|---|---|---|---|
| | Example 1 | Example 2 | Example 3 |
| Monoacetin | 2 | 1 | 1 |
| Diacetin | 2 | 1 | 1 |
| Triacetin | 2 | 1 | 1 |
| Monopropionin | 1 | 2 | 1 |
| Dipropionin | 1 | 2 | 1 |
| Tripropionin | 1 | 2 | 1 |
| Monobutyrin | 1 | 1 | 2 |
| Dibutyrin | 1 | 1 | 2 |
| Triburyrin | 1 | 1 | 2 |

Thus, these glyceride mixtures can be used in accordance with the practice as ingredients or additives for mixed feeds especially for such feed concentrates as cereal grains, soy bean meal, rice bran, fish meal, wheat bran, corns or the like, the amount of the mixture being suitably adjusted according to the purposes and uses. The glyceride mixture can be an ingredient of ruminant feeds such as calf feeds, fattening feeds and dairy feeds, and the like. For instance, usually 10–20% or upwards by weight of the mixture is added to them. It is known from the examples measured daily gains of the body weight of the test animals that the glyceride mixture of the present invention can substitute the conventional cereal grains or concentrates as the available energy source. For instance, the glyceride mixture of this invention provides a cow or calf with a range of 0.1~0.4 kg/day/100kg of body weight, preferably 1.2 kg.

According to the present invention, the amount of concentrates to be used can be decreased. Therefore some diseases such as renal calculi or feed-lot bloat which occur very frequently with the high concentrates-low forage system can be prevented. The following examples are directed to the further explanation of the utility of the present invention.

EXAMPLE I

Give to calves a mixed feed of glyceride for eight weeks according to the conventional practice and measure the increased body weight gains. The test animals B, C, D in Table 2 represent the calves provided with glyceride relative to the present invention.

A. Feeds composition

Table 2

| Test animal | Concentrates (Kg) | Rice straw (Kg) | Glyceride | |
|---|---|---|---|---|
| | | | Amount (Kg) | Fixed ratio |
| A (Control) | 9 | 2 | — | — |
| B | 7 | 2 | 0.67 | Example 1 |
| C | 7 | 2 | 0.67 | Example 2 |
| D | 7 | 2 | 0.67 | Example 3 |

Note: Refer to Table 1 for mixed ratio of glyceride

B. Results

Table 3

| Test animal | weight before test (Kg) | Weight after test (Kg) | Increased amount (Kg) | Daily gains (Kg) |
|---|---|---|---|---|
| A (Control) | 312 | 371 | 59 | 1.05 |
| B | 329 | 400 | 71 | 1.27 |
| C | 275 | 357 | 82 | 1.47 |
| D | 348 | 404 | 56 | 1.00 |

EXAMPLE II

As in Example I, give feed to a calf for seven weeks and measure the increased amount of body weight gains.

A.. Feeds composition

Table 4

| Test animal | Concentrates* (Kg) | Alfalfa hay (Kg) | Rice straw (Kg) | Glyceride Amount (Kg) | Glyceride Mixed ratio |
|---|---|---|---|---|---|
| A (Control) | 4.5 | 2 | 3 | — | — |
| B | 5.0 | 2 | 3 | 1.2 | Example 1 |
| C | 4.5 | 2 | 3 | 1.2 | Example 2 |
| D | 5.0 | 2 | 3 | 1.2 | Example 3 |

*Concentrates are given 4.5 Kg to calf having a body weight of 350–400 Kg and 5.0 Kg to ones having body weight of 400–450 Kg. Accordingly, a test calf provided with 4.5 Kg of concentrates during the test was given 5.0 Kg when the weight exceeded 400 Kg.

B. Results

Table 5

| Test animal | Weight before test (Kg) | Weight after test (Kg) | Increased amount (Kg) | Daily gains (Kg) |
|---|---|---|---|---|
| A (Control) | 374 | 399 | 25 | 0.51 |
| B | 401 | 455 | 54 | 1.12 |
| C | 372 | 430 | 58 | 1.18 |
| D | 413 | 457 | 44 | 0.89 |

What is claimed is:

1. A growth-promoting feed additive for domestic cattle comprising a glyceride mixture consisting of mono-, di- and triglycerides of acetic, propionic and butyric fatty acids in which the mon-, di- and triglyceride for each fatty acid is in the molar ratio of 1:1:1, in which glyceride mixture the molar equivalent ratio range of the propionic acid residue to the sum of the molar equivalents of the acetic and butyric acids is 0.3–3.0.

2. The growth promoting feed additive of claim 1 in which the molar ratio of acetic : propionic : butyric glycerides are 1:2:1.

3. A method of promoting the growth of domestic cattle comprising the step of feeding cattle a growth promoting amount of the glyceride mixture as defined in claim 1.

4. A method of promoting the growth of domestic cattle comprising the steps of mixing the additive as defined in claim 1 with conventional feed for domestic cattle and feeding the mixture to domestic cattle.

5. A method of promoting the growth of domestic cattle comprising feeding domestic cattle 1.2 kg. per day of the additive as defined in claim 1.

* * * * *

Disclaimer 3,952,107.—*Fumio Shibata*, Nagoya, Japan. GROWTH PROMOTION USING A CERTAIN GLYCERIDE MIXTURE. Patent dated Apr. 20, 1976. Disclaimer filed Nov. 21, 1985, by the assignee, *Nihon Nohyaku Kabushiki Kaisha.*

Hereby enters this disclaimer to all claims of said patent.
[*Official Gazette February 25, 1986.*]